(12) United States Patent
Mehlhorn et al.

(10) Patent No.: US 8,133,034 B2
(45) Date of Patent: Mar. 13, 2012

(54) CONTROLLER FOR A MOTOR AND A METHOD OF CONTROLLING THE MOTOR

(75) Inventors: William L. Mehlhorn, Menomonee Falls, WI (US); Brian T. Branecky, Oconomowoc, WI (US); Ronald P. Bartos, Menomonee Falls, WI (US); Steve D. O'Brien, Troy, OH (US); Howard Richardson, Springfield, OH (US)

(73) Assignee: Regal Beloit EPC Inc., Beloit, WI (US)

( * ) Notice: Subject to any disclaimer, the term of this patent is extended or adjusted under 35 U.S.C. 154(b) by 1058 days.

(21) Appl. No.: 11/348,958

(22) Filed: Feb. 7, 2006

(65) Prior Publication Data

US 2006/0127227 A1    Jun. 15, 2006

Related U.S. Application Data

(63) Continuation-in-part of application No. 11/102,070, filed on Apr. 8, 2005.

(60) Provisional application No. 60/561,063, filed on Apr. 9, 2004.

(51) Int. Cl.
F04B 49/06         (2006.01)
(52) U.S. Cl. ........................................ 417/53; 417/44.11
(58) Field of Classification Search ................ 417/53, 417/44.11; 318/434
See application file for complete search history.

(56) References Cited

U.S. PATENT DOCUMENTS

| | | |
|---|---|---|
| 1,061,919 A | 5/1913 | Miller |
| 2,767,277 A | 10/1956 | Wirth |
| 3,191,935 A | 6/1965 | Uecker |
| 3,558,910 A | 1/1971 | Dale et al. |
| 3,781,925 A | 1/1974 | Curtis et al. |
| 3,838,597 A | 10/1974 | Montgomery |
| 3,953,777 A | 4/1976 | McKee |
| 3,963,375 A | 6/1976 | Curtis |
| 4,021,700 A | 5/1977 | Ellis-Anwyl |

(Continued)

FOREIGN PATENT DOCUMENTS

DE    2946049    5/1981

(Continued)

OTHER PUBLICATIONS

United States Patent Office Action for U.S. Appl. No. 11/102,070 dated Nov. 30, 2009 (10 pages).

(Continued)

*Primary Examiner* — Devon C Kramer
*Assistant Examiner* — Philip Stimpert
(74) *Attorney, Agent, or Firm* — Michael Best & Friedrich LLP

(57) ABSTRACT

A method of controlling a motor operating a pumping apparatus of a fluid-pumping application. The pumping apparatus includes a pump having an inlet to receive a fluid and an outlet to exhaust the fluid, and the motor coupled to the pump to operate the pump. The method includes the acts of controlling the motor to operate the pump and monitoring the operation of the pump. The monitoring act includes monitoring a power of the motor, and determining whether the monitored power indicates an undesired flow of fluid through the pump. The method further includes the act of controlling the motor to cease operation of the pump when the determination indicates an undesired flow of fluid through the pump and zero or more other conditions exist.

13 Claims, 12 Drawing Sheets

U.S. PATENT DOCUMENTS

| | | | |
|---|---|---|---|
| 4,168,413 A | 9/1979 | Halpine | |
| 4,185,187 A | 1/1980 | Rogers | |
| 4,319,712 A | 3/1982 | Bar | |
| 4,370,098 A | 1/1983 | McClain et al. | |
| 4,371,315 A | 2/1983 | Shikasho | |
| 4,420,787 A | 12/1983 | Tibbits et al. | |
| 4,428,434 A | 1/1984 | Gelaude | |
| 4,449,260 A | 5/1984 | Whitaker | |
| 4,473,338 A | 9/1984 | Garmong | |
| 4,504,773 A | 3/1985 | Suzuki et al. | |
| 4,505,643 A | 3/1985 | Millis et al. | |
| 4,514,989 A | 5/1985 | Mount | |
| 4,541,029 A | 9/1985 | Ohyama | |
| 4,581,900 A | 4/1986 | Lowe et al. | |
| 4,620,835 A * | 11/1986 | Bell | 417/17 |
| 4,647,825 A | 3/1987 | Profio et al. | |
| 4,676,914 A | 6/1987 | Mills et al. | |
| 4,678,404 A | 7/1987 | Lorett et al. | |
| 4,695,779 A | 9/1987 | Yates | |
| 4,697,464 A | 10/1987 | Martin | |
| 4,703,387 A | 10/1987 | Miller | |
| 4,758,697 A | 7/1988 | Jeuneu | |
| 4,837,656 A | 6/1989 | Barnes | |
| 4,839,571 A | 6/1989 | Farnham et al. | |
| 4,841,404 A | 6/1989 | Marshall et al. | |
| 4,864,287 A | 9/1989 | Kierstead | |
| 4,885,655 A | 12/1989 | Springer et al. | |
| 4,896,101 A | 1/1990 | Cobb | |
| 4,907,610 A | 3/1990 | Meincke | |
| 4,971,522 A | 11/1990 | Butlin | |
| 4,996,646 A | 2/1991 | Farrington | |
| 4,998,097 A | 3/1991 | Noth et al. | |
| 5,079,784 A | 1/1992 | Rist et al. | |
| 5,100,298 A | 3/1992 | Shibata et al. | |
| RE33,874 E | 4/1992 | Miller | |
| 5,167,041 A | 12/1992 | Burkitt, III | |
| 5,172,089 A | 12/1992 | Wright et al. | |
| 5,234,286 A | 8/1993 | Wagner | |
| 5,255,148 A | 10/1993 | Yeh | |
| 5,324,170 A | 6/1994 | Anastos et al. | |
| 5,347,664 A | 9/1994 | Hamza et al. | |
| 5,361,215 A | 11/1994 | Tompkins et al. | |
| 5,422,014 A | 6/1995 | Allen et al. | |
| 5,473,497 A | 12/1995 | Beatty | |
| 5,545,012 A | 8/1996 | Anastos et al. | |
| 5,548,854 A | 8/1996 | Bloemer et al. | |
| 5,550,753 A | 8/1996 | Tompkins et al. | |
| 5,559,720 A | 9/1996 | Tompkins et al. | |
| 5,570,481 A | 11/1996 | Mathis et al. | |
| 5,577,890 A | 11/1996 | Nielsen et al. | |
| 5,601,413 A | 2/1997 | Langley et al. | |
| 5,624,237 A | 4/1997 | Prescott et al. | |
| 5,632,468 A | 5/1997 | Schoenmeyr | |
| 5,633,540 A | 5/1997 | Moan | |
| 5,690,476 A | 11/1997 | Miller | |
| 5,727,933 A | 3/1998 | Laskaris et al. | |
| 5,777,833 A | 7/1998 | Romillon | |
| 5,820,350 A | 10/1998 | Mantey et al. | |
| 5,833,437 A | 11/1998 | Kurth et al. | |
| 5,907,281 A | 5/1999 | Miller, Jr. et al. | |
| 5,930,092 A | 7/1999 | Nystrom | |
| 5,947,700 A | 9/1999 | McKain | |
| 5,959,534 A | 9/1999 | Campbell et al. | |
| 5,977,732 A | 11/1999 | Matsumoto | |
| 6,043,461 A | 3/2000 | Holling et al. | |
| 6,045,333 A | 4/2000 | Breit | |
| 6,059,536 A | 5/2000 | Stingl | |
| 6,092,992 A | 7/2000 | Imblum et al. | |
| 6,157,304 A | 12/2000 | Bennett et al. | |
| 6,171,073 B1 | 1/2001 | McKain et al. | |
| 6,199,224 B1 | 3/2001 | Versland | |
| 6,213,724 B1 | 4/2001 | Haugen et al. | |
| 6,216,814 B1 | 4/2001 | Fujita et al. | |
| 6,238,188 B1 | 5/2001 | Lifson | |
| 6,253,227 B1 | 6/2001 | Tompkins et al. | |
| 6,342,841 B1 | 1/2002 | Stingl | |
| 6,354,805 B1 | 3/2002 | Moller | |
| 6,364,621 B1 | 4/2002 | Yamauchi | |
| 6,390,781 B1 | 5/2002 | McDonough | |
| 6,468,042 B2 | 10/2002 | Moller | |
| 6,468,052 B2 | 10/2002 | McKain et al. | |
| 6,481,973 B1 | 11/2002 | Struthers | |
| 6,501,629 B1 | 12/2002 | Marriott | |
| 6,504,338 B1 | 1/2003 | Eichorn | |
| 6,522,034 B1 | 2/2003 | Nakayama | |
| 6,534,940 B2 | 3/2003 | Bell et al. | |
| 6,534,947 B2 | 3/2003 | Johnson et al. | |
| 6,543,940 B2 | 4/2003 | Chu | |
| 6,590,188 B2 | 7/2003 | Cline et al. | |
| 6,595,762 B2 | 7/2003 | Khanwilkar et al. | |
| 6,616,413 B2 | 9/2003 | Humpheries | |
| 6,623,245 B2 | 9/2003 | Meza et al. | |
| 6,636,135 B1 | 10/2003 | Vetter | |
| 6,638,023 B2 | 10/2003 | Scott | |
| 6,676,831 B2 | 1/2004 | Wolfe | |
| 6,696,676 B1 | 2/2004 | Graves et al. | |
| 6,709,240 B1 | 3/2004 | Schmalz et al. | |
| 6,715,996 B2 | 4/2004 | Moeller | |
| 6,732,387 B1 | 5/2004 | Waldron | |
| 6,768,279 B1 | 7/2004 | Skinner et al. | |
| 6,806,677 B2 | 10/2004 | Kelly et al. | |
| 6,875,961 B1 | 4/2005 | Collins | |
| 6,895,608 B2 | 5/2005 | Goettl | |
| 6,906,482 B2 | 6/2005 | Shimizu et al. | |
| 6,933,693 B2 | 8/2005 | Schuchmann | |
| 6,941,785 B2 | 9/2005 | Haynes et al. | |
| 6,965,815 B1 | 11/2005 | Tompkins et al. | |
| 6,976,052 B2 | 12/2005 | Tompkins et al. | |
| 7,055,189 B2 | 6/2006 | Goettl | |
| 7,117,120 B2 | 10/2006 | Beck et al. | |
| 7,163,380 B2 | 1/2007 | Jones | |
| 7,327,275 B2 | 2/2008 | Brochu et al. | |
| 2001/0029407 A1 | 10/2001 | Tompkins et al. | |
| 2002/0176783 A1* | 11/2002 | Moeller | 417/44.11 |
| 2002/0190687 A1* | 12/2002 | Bell et al. | 318/778 |
| 2003/0106147 A1 | 6/2003 | Cohen et al. | |
| 2004/0009075 A1 | 1/2004 | Meza et al. | |
| 2004/0062658 A1 | 4/2004 | Beck et al. | |
| 2004/0090197 A1 | 5/2004 | Schuchmann | |
| 2004/0205886 A1 | 10/2004 | Goettl | |
| 2004/0213676 A1 | 10/2004 | Phillips | |
| 2005/0097665 A1 | 5/2005 | Goettl | |
| 2005/0123408 A1* | 6/2005 | Koehl | 417/53 |
| 2005/0133088 A1 | 6/2005 | Bologeorges | |
| 2005/0158177 A1 | 7/2005 | Mehlhorn | |
| 2005/0193485 A1 | 9/2005 | Wolfe | |
| 2005/0226731 A1 | 10/2005 | Mehlhorn | |
| 2005/0281681 A1 | 12/2005 | Anderson et al. | |
| 2006/0045750 A1 | 3/2006 | Stiles | |
| 2006/0090255 A1 | 5/2006 | Cohen | |
| 2006/0146462 A1 | 7/2006 | McMillian, IV | |
| 2006/0220604 A1 | 10/2006 | Hirai | |
| 2007/0114162 A1 | 5/2007 | Stiles, Jr. et al. | |
| 2007/0154319 A1 | 7/2007 | Stiles, Jr. et al. | |
| 2007/0154320 A1 | 7/2007 | Stiles, Jr. et al. | |
| 2007/0154321 A1 | 7/2007 | Stiles, Jr. et al. | |
| 2007/0154322 A1 | 7/2007 | Stiles, Jr. et al. | |
| 2007/0154323 A1 | 7/2007 | Stiles, Jr. et al. | |
| 2007/0163929 A1 | 7/2007 | Stiles, Jr. et al. | |
| 2007/0183902 A1 | 8/2007 | Stiles, Jr. et al. | |
| 2008/0003114 A1 | 1/2008 | Levin et al. | |
| 2008/0041839 A1 | 2/2008 | Tran | |
| 2008/0063535 A1 | 3/2008 | Koehl | |
| 2008/0095638 A1 | 4/2008 | Branecky | |
| 2008/0095639 A1 | 4/2008 | Bartos | |
| 2008/0095640 A1 | 4/2008 | Branecky | |
| 2008/0168599 A1 | 7/2008 | Caudill et al. | |
| 2009/0280014 A1 | 11/2009 | Branecky | |
| 2009/0288407 A1 | 11/2009 | Bartos | |
| 2009/0290989 A1 | 11/2009 | Mehlhorn | |
| 2009/0290990 A1 | 11/2009 | Branecky | |
| 2009/0290991 A1 | 11/2009 | Mehlhorn | |
| 2010/0068073 A1 | 3/2010 | Branecky | |
| 2010/0080714 A1 | 4/2010 | Mehlhorn | |
| 2010/0232981 A1 | 9/2010 | Branecky | |
| 2011/0002792 A1 | 1/2011 | Bartos | |

FOREIGN PATENT DOCUMENTS

| | | |
|---|---|---|
| DE | 19736079 | 2/1999 |
| EP | 0150068 | 7/1985 |
| EP | 0226858 | 7/1987 |
| EP | 0246769 | 11/1987 |
| EP | 0833436 | 4/1998 |
| EP | 1585205 | 10/2005 |
| JP | 355072678 | 5/1980 |
| WO | 2005/111473 | 11/2005 |
| WO | 2010/039580 | 4/2010 |

OTHER PUBLICATIONS

United States Patent Office Action for U.S. Appl. No. 11/102,070 dated Febrary 19, 2009 (6 pages).
Failsafe, LLC, Save Lives! Use Fail-Safe Suction-Safe Pool & Spa Pumps, brochure, Dec. 31, 2000, 4 pages, Aurora, Colorado.
Failsafe, LLC, Suction-Safe Pool & Spa Pump Operator's Manual, brochure, Apr. 8, 2003, 12 pages, Aurora, Colorado.
United States Patent Office Action for U.S. Appl. No. 11/549,537 dated Feb. 9, 2009 (22 pages).
United States Patent Office Action for U.S. Appl. No. 11/102,070 dated Feb. 19, 2009 (6 pages).
United States Patent Office Action for U.S. Appl. No. 11/549,518 dated Apr. 2, 2009 (9 pages).
United States Patent Office Action for U.S. Appl. No. 11/549,499 dated Apr. 1, 2009 (13 pages).
Extended European Search Report of the European Patent Office for Application No. 07118064.0 dated Feb. 28, 2008, 11 pages.
United States Patent Office Action for U.S. Appl. No. 11/102,070 dated Feb. 13, 2008, 15 pages.
STA-Rite Industries, Inc., "60 Cycle 'C' and 'CC' Series Centrifugal Pumps for Swimming Pool Use—Owner's Manual," S408 (Dec. 10, 2002) 16 pages.
European Patent Office Search Report for Application No. 05252215.8 dated Oct. 30, 2008 (3 pages).
United States Patent Office Action for U.S. Appl. No. 11/102,070 dated Jun. 18, 2010 (9 pages).
United States Patent Office Action for U.S. Appl. No. 11/102,070 dated Jan. 20, 2011 (26 pages).
European Patent Office Action for Application No. 07250159.6 dated Jul. 20, 2011 (8 pages).
United States Patent Office Notice of Allowance for U.S. Appl. No. 11/102,070 dated Nov. 23, 2011 (9 pages).
United States Patent Office Action for U.S. Appl. No. 12/506,349 dated Nov. 28, 2011 (16 pages).

* cited by examiner

CONTROLLER FOR A MOTOR AND A METHOD OF CONTROLLING THE MOTOR

RELATED APPLICATIONS

This application is a continuation-in-part of U.S. patent application Ser. No. 11/102,070, filed on Apr. 8, 2005, which claims the benefit of U.S. Provisional Patent Application No. 60/561,063, filed on Apr. 9, 2004, entitled CONTROLLER FOR A MOTOR AND A METHOD OF CONTROLLING THE MOTOR, both of which are incorporated herein by reference.

BACKGROUND

The invention relates to a controller for a motor, and particularly, a controller for a motor operating a pump.

Occasionally on a swimming pool, spa, or similar jetted-fluid application, the main drain can become obstructed with an object, such as a towel or pool toy. When this happens, the suction force of the pump is applied to the obstruction and the object sticks to the drain. This is called suction entrapment. If the object substantially covers the drain (such as a towel covering the drain), water is pumped out of the drain side of the pump. Eventually the pump runs dry, the seals burn out, and the pump can be damaged.

Another type of entrapment is referred to as mechanical entrapment. Mechanical entrapment occurs when an object, such as a towel or pool toy, gets tangled in the drain cover. Mechanical entrapment may also effect the operation of the pump.

Several solutions have been proposed for suction and mechanical entrapment. For example, new pool construction is required to have two drains, so that if one drain becomes plugged, the other can still flow freely and no vacuum entrapment can take place. This does not help existing pools, however, as adding a second drain to an in-ground, one-drain pool is very difficult and expensive. Modern pool drain covers are also designed such that items cannot become entwined with the cover.

As another example, several manufacturers offer systems known as Safety Vacuum Release Systems (SVRS). SVRS often contain several layers of protection to help prevent both mechanical and suction entrapment. Most SVRS use hydraulic release valves that are plumbed into the suction side of the pump. The valve is designed to release (open to the atmosphere) if the vacuum (or pressure) inside the drain pipe exceeds a set threshold, thus releasing the obstruction. These valves can be very effective at releasing the suction developed under these circumstances. Unfortunately, they have several technical problems that have limited their use. The first problem is that when the valve releases, the pump loses its water supply and the pump can still be damaged. The second problem is that the release valve typically needs to be mechanically adjusted for each pool. Even if properly adjusted, the valve can be prone to nuisance trips. The third problem is that the valve needs to be plumbed properly into the suction side of the pump. This makes installation difficult for the average homeowner.

SUMMARY

In one embodiment, the invention provides a controller for a motor that monitors motor input power and/or pump inlet side pressure (also referred to as pump inlet side vacuum). This monitoring helps to determine if a drain obstruction has taken place. If the drain or plumbing is substantially restricted on the suction side of the pump, the pressure on that side of the pump increases. At the same time, because the pump is no longer pumping fluid, input power to the motor drops. Either of these conditions may be considered a fault and the motor is powered down. It is also envisioned that should the pool filter become plugged, the pump input power also drops and the motor is powered down as well.

Other features and aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 1:
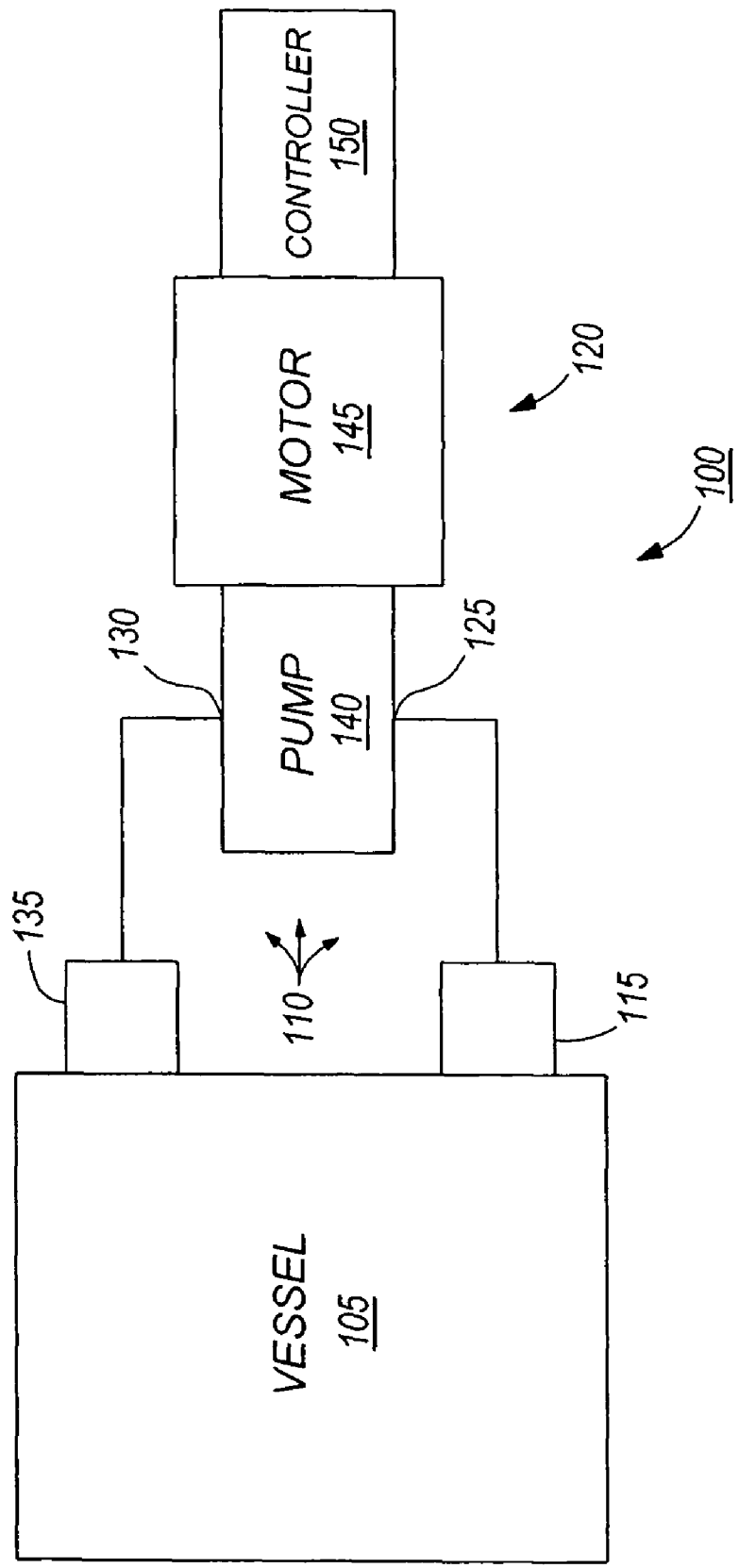
FIG. 1 is a schematic representation of a jetted-spa incorporating the invention.

FIG. 1 schematically represents a jetted-spa 100 incorporating the invention. However, the invention is not limited to the jetted-spa 100 and can be used in other jetted-fluid systems (e.g., pools, whirlpools, jetted-tubs, etc.). It is also envisioned that the invention can be used in other applications (e.g., fluid-pumping applications).

As shown in FIG. 1, the spa 100 includes a vessel 105. As used herein, the vessel 105 is a hollow container such as a tub, pool, tank, or vat that holds a load. The load includes a fluid, such as chlorinated water, and may include one or more occupants or items. The spa further includes a fluid-movement system 110 coupled to the vessel 105. The fluid-movement system 110 includes a drain 115, a pumping apparatus 120 having an inlet 125 coupled to the drain and an outlet 130, and a return 135 coupled to the outlet 130 of the pumping apparatus 120. The pumping apparatus 120 includes a pump 140, a motor 145 coupled to the pump 140, and a controller 150 for controlling the motor 145. For the constructions described herein, the pump 140 is a centrifugal pump and the motor 145 is an induction motor (e.g., capacitor-start, capacitor-run induction motor; split-phase induction motor; three-phase induction motor; etc.). However, the invention is not limited to this type of pump or motor. For example, a brushless, direct current (DC) motor may be used in a different pumping application. For other constructions, a jetted-fluid system can include multiple drains, multiple returns, or even multiple fluid movement systems.

Referring back to FIG. 1, the vessel 105 holds a fluid. When the fluid movement system 110 is active, the pump 140 causes the fluid to move from the drain 115, through the pump 140, and jet into the vessel 105. This pumping operation occurs when the controller 150 controllably provides a power to the motor 145, resulting in a mechanical movement by the motor 145. The coupling of the motor 145 (e.g., a direct coupling or an indirect coupling via a linkage system) to the pump 140 results in the motor 145 mechanically operating the pump 140 to move the fluid. The operation of the controller 150 can be via an operator interface, which may be as simple as an ON switch.

Figure 2:
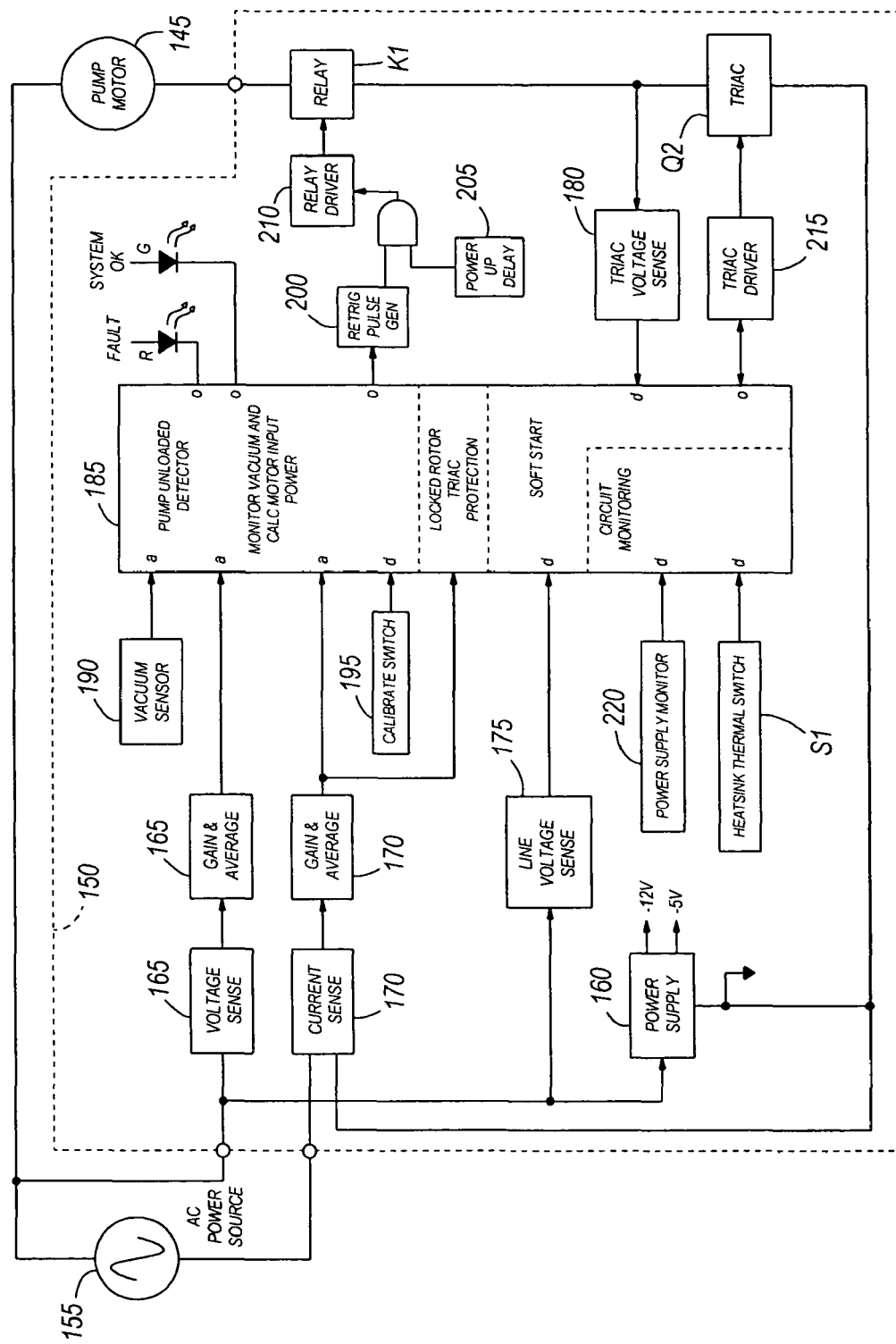
FIG. 2 is a block diagram of a first controller capable of being used in the jetted-spa shown in FIG. 1.
Figure 3A:
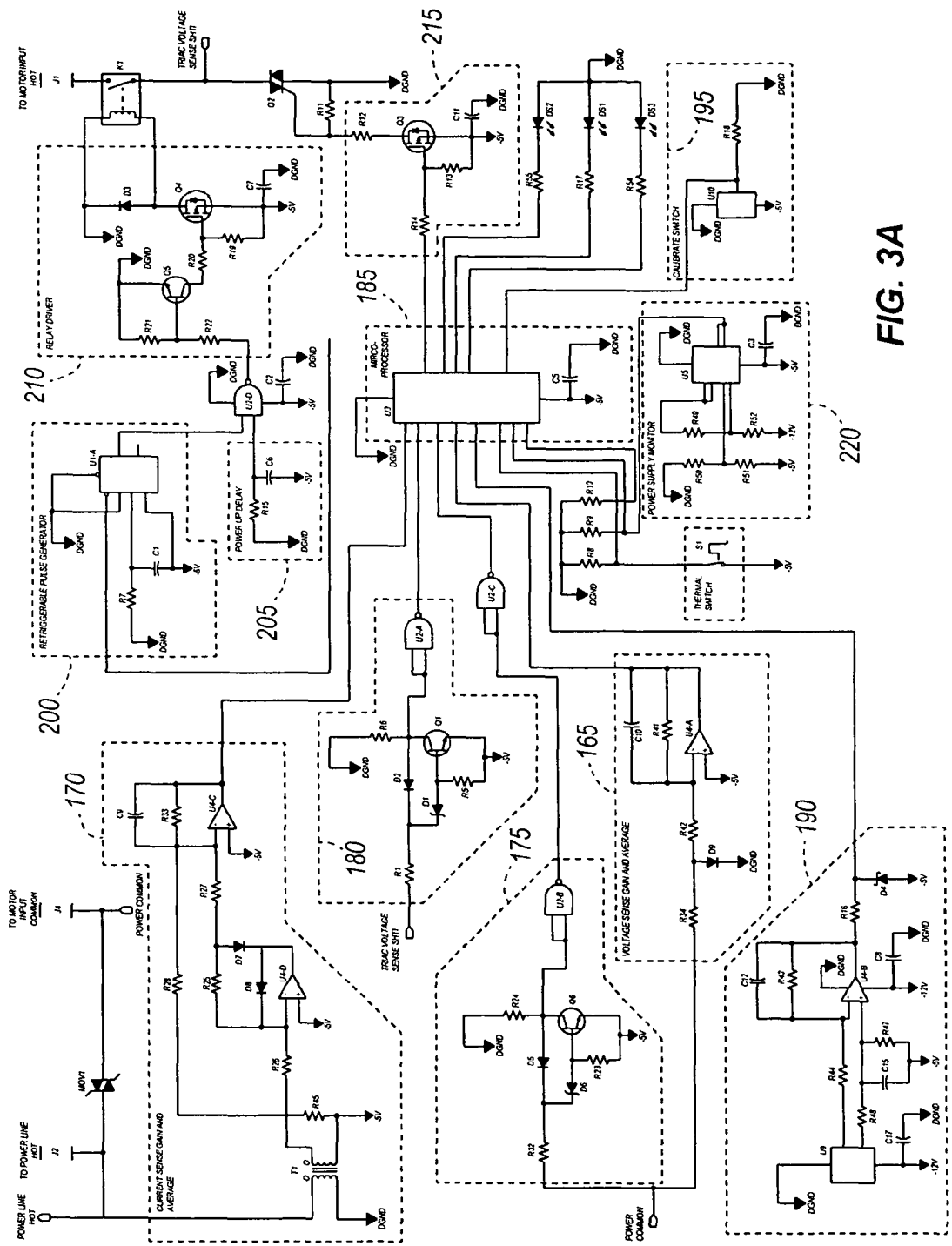
FIGS. 3A and 3B are electrical schematics of the first controller shown in FIG. 2.
Figure 3B:
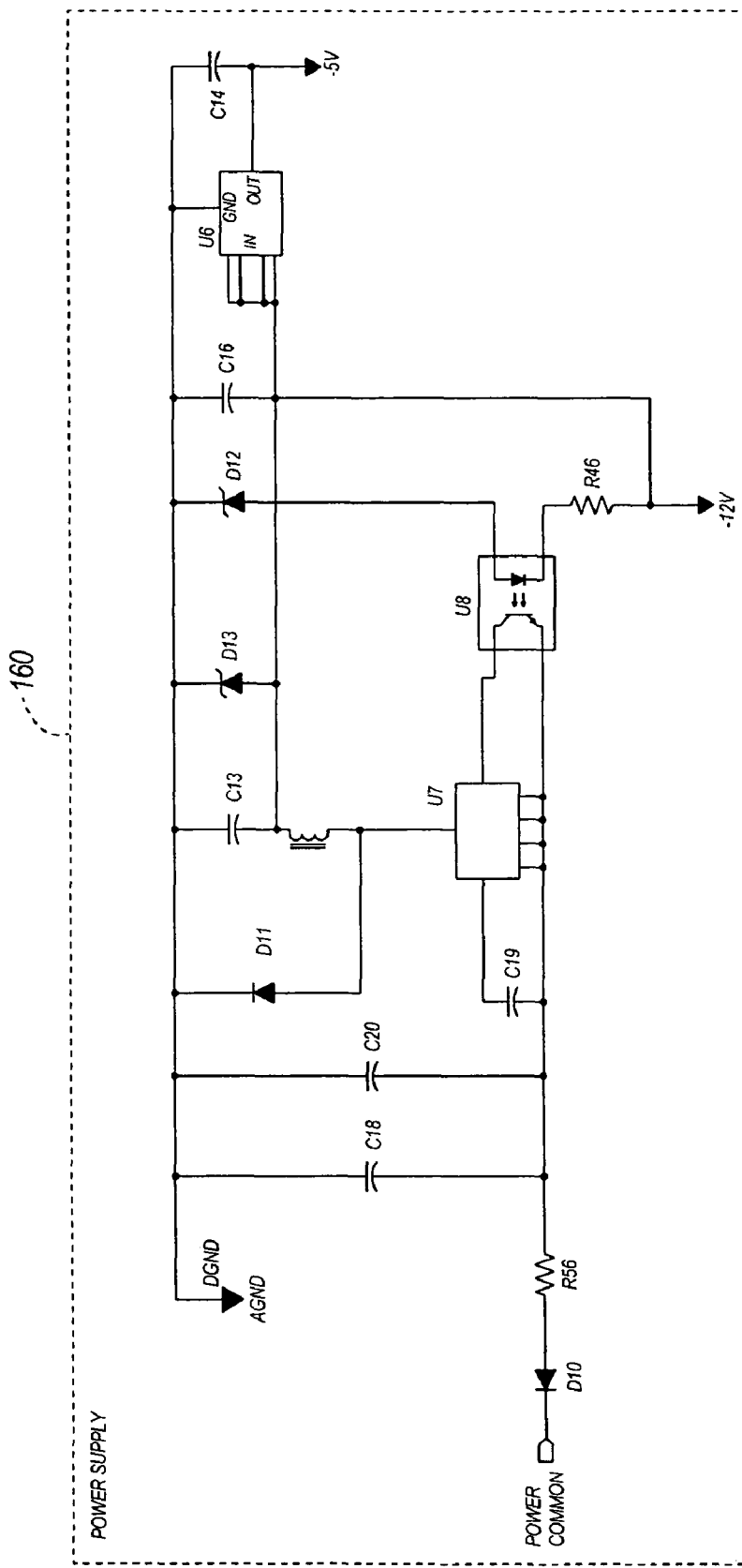

FIG. 2 is a block diagram of a first construction of the controller 150, and FIGS. 3A and 3B are electrical schematics of the controller 150. As shown in FIG. 2, the controller 150 is electrically connected to a power source 155 and the motor 145.

With reference to FIG. 2 and FIG. 3B, the controller 150 includes a power supply 160. The power supply 160 includes resistors R46 and R56; capacitors C13, C14, C16, C18, C19, and C20; diodes D10 and D11; zener diodes D12 and D13; power supply controller U7; regulator U6; and optical switch U8. The power supply 160 receives power from the power source 155 and provides the proper DC voltage (e.g., −5 VDC and −12 VDC) for operating the controller 150.

For the controller 150 shown in FIGS. 2 and 3A, the controller 150 monitors motor input power and pump inlet side pressure to determine if a drain obstruction has taken place. If the drain 115 or plumbing is plugged on the suction side of the pump 140, the pressure on that side of the pump 140 increases. At the same time, because the pump 140 is no longer pumping water, input power to the motor 145 drops. If either of these conditions occur, the controller 150 declares a fault, the motor 145 powers down, and a fault indicator lights.

A voltage sense and average circuit 165, a current sense and average circuit 170, a line voltage sense circuit 175, a triac voltage sense circuit 180, and the microcontroller 185 perform the monitoring of the input power. One example voltage sense and average circuit 165 is shown in FIG. 3A. The voltage sense and average circuit 165 includes resistors R34, R41, and R42; diode D9; capacitor C10; and operational amplifier U4A. The voltage sense and average circuit rectifies the voltage from the power source 155 and then performs a DC average of the rectified voltage. The DC average is then fed to the microcontroller 185.

One example current sense and average circuit 170 is shown in FIG. 3A. The current sense and average circuit 170 includes transformer T1 and resistor R45, which act as a current sensor that senses the current applied to the motor. The current sense and average circuit also includes resistors R25, R26, R27, R28, and R33; diodes D7 and D8; capacitor C9; and operational amplifiers U4C and U4D, which rectify and average the value representing the sensed current. For example, the resultant scaling of the current sense and average circuit 170 can be a negative five to zero volt value corresponding to a zero to twenty-five amp RMS value. The resulting DC average is then fed to the microcontroller 185.

One example line voltage sense circuit 175 is shown in FIG. 3A. The line voltage sense circuit 175 includes resistors R23, R24, and R32; diode D5; zener diode D6; transistor Q6; and NAND gate U2B. The line voltage sense circuit 175 includes a zero-crossing detector that generates a pulse signal. The pulse signal includes pulses that are generated each time the line voltage crosses zero volts.

One example triac voltage sense circuit 180 is shown in FIG. 3A. The triac voltage sense circuit 180 includes resistors R1, R5, and R6; diode D2; zener diode D1; transistor Q1; and NAND gate U2A. The triac voltage sense circuit includes a zero-crossing detector that generates a pulse signal. The pulse signal includes pulses that are generated each time the motor current crosses zero.

One example microcontroller 185 that can be used with the invention is a Motorola brand microcontroller, model no. MC68HC908QY4CP. The microcontroller 185 includes a processor and a memory. The memory includes software instructions that are read, interpreted, and executed by the processor to manipulate data or signals. The memory also includes data storage memory. The microcontroller 185 can include other circuitry (e.g., an analog-to-digital converter) necessary for operating the microcontroller 185. In general, the microcontroller 185 receives inputs (signals or data), executes software instructions to analyze the inputs, and generates outputs (signals or data) based on the analyses. Although the microcontroller 185 is shown and described, the invention can be implemented with other devices, including a variety of integrated circuits (e.g., an application-specific-integrated circuit), programmable devices, and/or discrete devices, as would be apparent to one of ordinary skill in the art. Additionally, it is envisioned that the microcontroller 185 or similar circuitry can be distributed among multiple microcontrollers 185 or similar circuitry. It is also envisioned that the microcontroller 185 or similar circuitry can perform the function of some of the other circuitry described (e.g., circuitry 165-180) above for the controller 150. For example, the microcontroller 185, in some constructions, can receive a sensed voltage and/or sensed current and determine an averaged voltage, an averaged current, the zero-crossings of the sensed voltage, and/or the zero crossings of the sensed current.

The microcontroller 185 receives the signals representing the average voltage applied to the motor 145, the average current through the motor 145, the zero crossings of the motor voltage, and the zero crossings of the motor current. Based on the zero crossings, the microcontroller 185 can determine a power factor. The power factor can be calculated using known mathematical equations or by using a lookup table based on the mathematical equations. The microcontroller 185 can then calculate a power with the averaged voltage, the averaged current, and the power factor as is known. As will be discussed later, the microcontroller 185 compares the calculated power with a power calibration value to determine whether a fault condition (e.g., due to an obstruction) is present.

Referring again to FIGS. 2 and 3A, a pressure (or vacuum) sensor circuit 190 and the microcontroller 185 monitor the pump inlet side pressure. One example pressure sensor circuit 190 is shown in FIG. 3A. The pressure sensor circuit 190 includes resistors R16, R43, R44, R47, and R48; capacitors C8, C12, C15, and C17; zener diode D4, piezoresistive sensor U9, and operational amplifier U4-B. The piezoresistive sensor U9 is plumbed into the suction side of the pump 140. The pressure sensor circuit 190 and microcontroller 185 translate and amplify the signal generated by the piezoresistive sensor U9 into a value representing inlet pressure. As will be discussed later, the microcontroller 185 compares the resulting pressure value with a pressure calibration value to determine whether a fault condition (e.g., due to an obstruction) is present.

The calibrating of the controller 150 occurs when the user activates a calibrate switch 195. One example calibrate switch 195 is shown in FIG. 3A. The calibrate switch 195 includes resistor R18 and Hall effect switch U10. When a magnet passes Hall effect switch U10, the switch 195 generates a signal provided to the microcontroller 185. Upon receiving the signal, the microcontroller 185 stores a pressure calibration value for the pressure sensor by acquiring the current pressure and stores a power calibration value for the motor by calculating the present power.

As stated earlier, the controller 150 controllably provides power to the motor 145. With references to FIGS. 2 and 3A, the controller 150 includes a retriggerable pulse generator circuit 200. The retriggerable pulse generator circuit 200 includes resistor R7, capacitor C1, and pulse generator U1A, and outputs a value to NAND gate U2D if the retriggerable pulse generator circuit 200 receives a signal having a pulse frequency greater than a set frequency determined by resistor R7 and capacitor C1. The NAND gate U2D also receives a signal from power-up delay circuit 205, which prevents nuisance triggering of the relay on startup. The output of the NAND gate U2D is provided to relay driver circuit 210. The relay driver circuit 210 shown in FIG. 3A includes resistors R19, R20, R21, and R22; capacitor C7; diode D3; and switches Q5 and Q4. The relay driver circuit 210 controls relay K1.

The microcontroller 185 also provides an output to triac driver circuit 215, which controls triac Q2. As shown in FIG. 3A, the triac driver circuit 215 includes resistors R12, R13, and R14; capacitor C11; and switch Q3. In order for current to flow to the motor, relay K1 needs to close and triac Q2 needs to be triggered on.

The controller 150 also includes a thermoswitch S1 for monitoring the triac heat sink, a power supply monitor 220 for monitoring the voltages produced by the power supply 160, and a plurality of LEDs DS1, DS2, and DS3 for providing information to the user. In the construction shown, a green LED DS1 indicates power is applied to the controller 150, a red LED DS2 indicates a fault has occurred, and a third LED DS3 is a heartbeat LED to indicate the microcontroller 185 is functioning. Of course, other interfaces can be used for providing information to the operator.

The following describes the normal sequence of events for one method of operation of the controller 150. When the fluid movement system 110 is initially activated, the system 110 may have to draw air out of the suction side plumbing and get the fluid flowing smoothly. This "priming" period usually lasts only a few seconds, but could last a minute or more if there is a lot of air in the system. After priming, the water flow, suction side pressure, and motor input power remain relatively constant. It is during this normal running period that the circuit is effective at detecting an abnormal event. The microcontroller 185 includes a startup-lockout feature that keeps the monitor from detecting the abnormal conditions during the priming period.

After the system 110 is running smoothly, the spa operator can calibrate the controller 150 to the current spa running conditions. The calibration values are stored in the microcontroller 185 memory, and will be used as the basis for monitoring the spa 100. If for some reason the operating conditions of the spa change, the controller 150 can be re-calibrated by the operator. If at any time during normal operations, however, the suction side pressure increases substantially (e.g., 12%) over the pressure calibration value, or the motor input power drops (e.g., 12%) under the power calibration value, the pump will be powered down and a fault indicator is lit.

As discussed earlier, the controller 150 measures motor input power, and not just motor power factor or input current. Some motors have electrical characteristics such that power factor remains constant while the motor is unloaded. Other motors have an electrical characteristic such that current remains relatively constant when the pump is unloaded. However, the input power drops on pump systems when the drain is plugged, and water flow is impeded.

The voltage sense and average circuit 165 generates a value representing the average power line voltage and the current sense and average circuit 170 generates a value representing the average motor current. Motor power factor is derived from the difference between power line zero crossing events and triac zero crossing events. The line voltage sense circuit 175 provides a signal representing the power line zero crossings. The triac zero crossings occur at the zero crossings of the motor current. The triac voltage sense circuit 180 provides a signal representing the triac zero crossings. The time difference from the zero crossing events is used to look up the motor power factor from a table stored in the microcontroller 185. This data is then used to calculate the motor input power using equation e1.

$$V_{avg} * I_{avg} * PF = \text{Motor\_Input\_Power} \quad [\text{e1}]$$

The calculated motor_input_power is then compared to the calibrated value to determine whether a fault has occurred. If a fault has occurred, the motor is powered down and the fault is lit.

Another aspect of the controller 150 is a "soft-start" feature. When a typical pump motor 145 is switched on, it quickly accelerates up to full speed. The sudden acceleration creates a vacuum surge on the inlet side of the pump 140, and a pressure surge on the discharge side of the pump 140. The vacuum surge can nuisance trip the hydraulic release valves of the spa 100. The pressure surge on the outlet can also create a water hammer that is hard on the plumbing and especially hard on the filter (if present). The soft-start feature slowly increases the voltage applied to the motor over a time period (e.g., two seconds). By gradually increasing the voltage, the motor accelerates more smoothly, and the pressure/vacuum spike in the plumbing is avoided.

Another aspect of the controller 150 is the use of redundant sensing systems. By looking at both pump inlet side pressure and motor input power, if a failure were to occur in either one, the remaining sensor would still shut down the system 110.

Redundancy is also used for the power switches that switch power to the motor. Both a relay and a triac are used in series to do this function. This way, a failure of either component will still leave one switch to turn off the motor 145. As an additional safety feature, the proper operation of both switches is checked by the microcontroller 185 every time the motor is powered on.

One benefit of using a triac Q2 in series with the relay K1 is that the triac Q2 can be used as the primary switching element, thus avoiding a lot of wear and tear on the relay contacts. When relay contacts open or close with an inductive motor or inductive load, arcing may occur, which eventually erodes the contact surfaces of the relay K1. Eventually the relay K1 will no longer make reliable contact or even stick in a closed position. By using the triac Q2 as the primary switch, the relay contacts can be closed before the triac completes the circuit to the motor 145. Likewise, when powering down, the triac Q2 can terminate conduction of current before the relay opens. This way there is no arcing of the relay contacts. The triac Q2 has no wear-out mechanism, so it can do this switching function repeatedly.

Another aspect of the controller 150 is the use of several monitoring functions to verify that all the circuits are working as intended. These functions can include verifying whether input voltage is in a reasonable range, verifying whether motor current is in a reasonable range, and verifying whether suction side pressure is in a reasonable range. For example, if motor current exceeds 135% of its calibrated value, the motor may be considered over-loaded and is powered down.

As discussed earlier, the controller 150 also monitors the power supply 160 and the temperature of the triac heat sink. If either is out of proper range, the controller 185 can power down the motor 145 and declare a fault. The controller 150 also monitors the line voltage sense and triac voltage sense circuits 175 and 180, respectively. If zero crossing pulses are received from either of these circuits at a frequency less than a defined time (e.g., every 80 milliseconds), the motor powers down.

Another aspect of the controller 150 is that the microcontroller 185 must provide pulses at a frequency greater than a set frequency (determined by the time constant of resistor R7 and C1) to close the relay K1. If the pulse generator U1A is not triggered at the proper frequency, the relay K1 opens and the motor powers down.

Thus, the invention provides, among other things, a controller for a motor operating a pump. While numerous aspects of the controller 150 were discussed above, not all of the aspects and features discussed above are required for the invention. For example, the controller 150 can be modified to monitor only motor input power or suction side pressure. Additionally, other aspects and features can be added to the controller 150 shown in the figures. For example, some of the features discussed below for controller 150a can be added to the controller 150.

Figure 4:
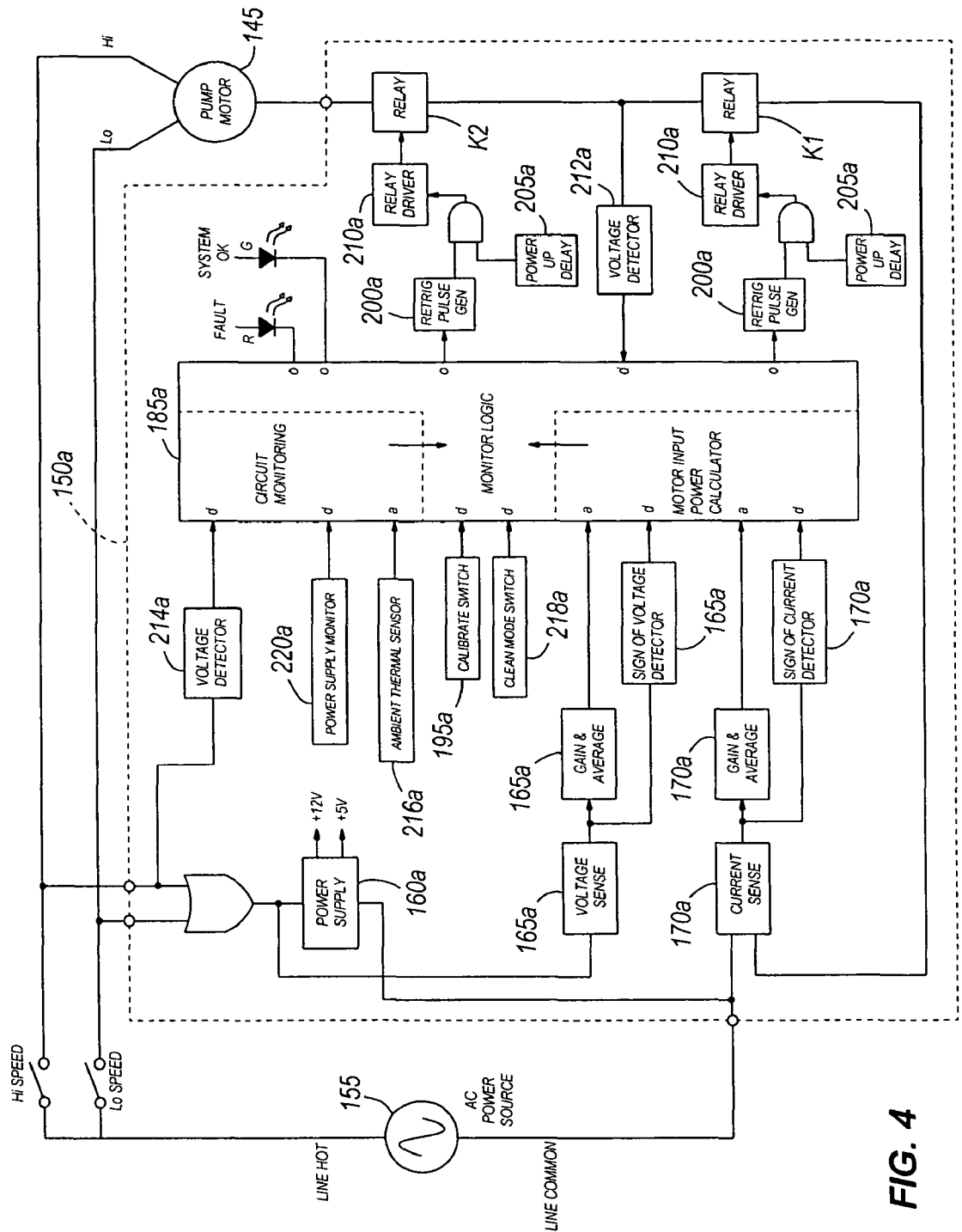
FIG. 4 is a block diagram of a second controller capable of being used in the jetted-spa shown in FIG. 1.
Figure 5A:
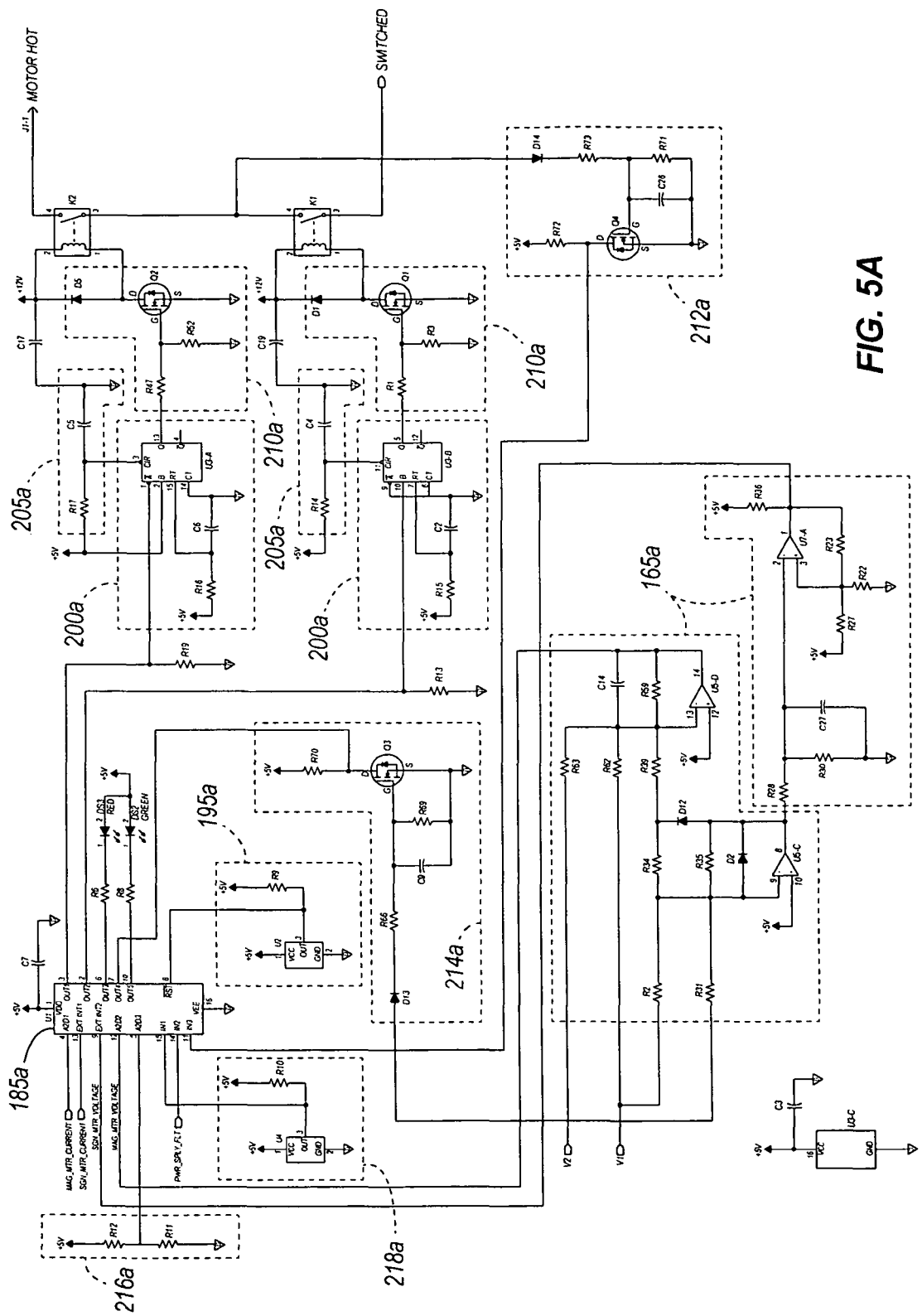
FIGS. 5A and 5B are electrical schematics of the second controller shown in FIG. 4.
Figure 5B:
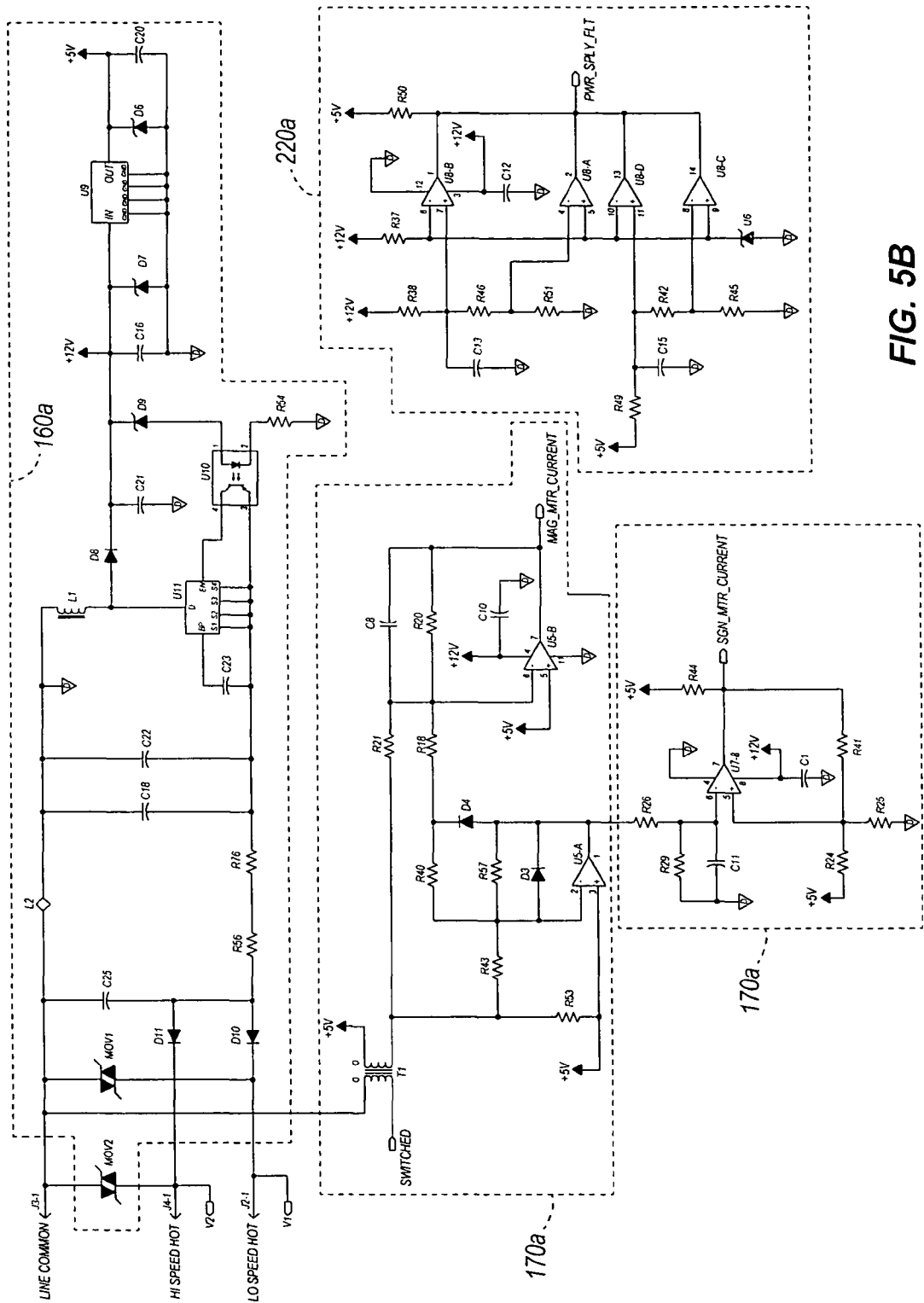

FIG. 4 is a block diagram of a second construction of the controller 150a, and FIGS. 5A and 5B are an electrical schematic of the controller 150a. As shown in FIG. 4, the controller 150a is electrically connected to a power source 155 and the motor 145.

With reference to FIG. 4 and FIG. 5B, the controller 150a includes a power supply 160a. The power supply 160a includes resistors R54, R56 and R76; capacitors C16, C18, C20, C21, C22, C23 and C25; diodes D8, D10 and D11; zener diodes D6, D7 and D9; power supply controller U11; regulator U9; inductors L1 and L2, surge suppressors MOV1 and MOV2, and optical switch U10. The power supply 160a receives power from the power source 155 and provides the proper DC voltage (e.g., +5 VDC and +12 VDC) for operating the controller 150a.

For the controller 150a shown in FIG. 4, FIG. 5A, and FIG. 5B, the controller 150a monitors motor input power to determine if a drain obstruction has taken place. Similar to the earlier disclosed construction, if the drain 115 or plumbing is plugged on the suction side of the pump 140, the pump 140 will no longer be pumping water, and input power to the motor 145 drops. If this condition occurs, the controller 150a declares a fault, the motor 145 powers down, and a fault indicator lights.

A voltage sense and average circuit 165a, a current sense and average circuit 170a, and the microcontroller 185a perform the monitoring of the input power. One example voltage sense and average circuit 165a is shown in FIG. 5A. The voltage sense and average circuit 165a includes resistors R2, R31, R34, R35, R39, R59, R62, and R63; diodes D2 and D12; capacitor C14; and operational amplifiers U5C and U5D. The voltage sense and average circuit 165a rectifies the voltage from the power source 155 and then performs a DC average of the rectified voltage. The DC average is then fed to the microcontroller 185a. The voltage sense and average circuit 165a further includes resistors R22, R23, R27, R28, R30, and R36; capacitor C27; and comparator U7A; which provide the sign of the voltage waveform (i.e., acts as a zero-crossing detector) to the microcontroller 185a.

One example current sense and average circuit 170a is shown in FIG. 5B. The current sense and average circuit 170a includes transformer T1 and resistor R53, which act as a current sensor that senses the current applied to the motor 145. The current sense and average circuit 170a also includes resistors R18, R20, R21, R40, R43, and R57; diodes D3 and D4; capacitor C8; and operational amplifiers U5A and U5B, which rectify and average the value representing the sensed current. For example, the resultant scaling of the current sense and average circuit 170a can be a positive five to zero volt value corresponding to a zero to twenty-five amp RMS value. The resulting DC average is then fed to the microcontroller 185a. The current sense and average circuit 170a further includes resistors R24, R25, R26, R29, R41, and R44; capacitor C11; and comparator U7B; which provide the sign of the current waveform (i.e., acts as a zero-crossing detector) to microcontroller 185a.

One example microcontroller 185a that can be used with the invention is a Motorola brand microcontroller, model no. MC68HC908QY4CP. Similar to what was discussed for the earlier construction, the microcontroller 185a includes a processor and a memory. The memory includes software instructions that are read, interpreted, and executed by the processor to manipulate data or signals. The memory also includes data storage memory. The microcontroller 185a can include other circuitry (e.g., an analog-to-digital converter) necessary for operating the microcontroller 185a and/or can perform the function of some of the other circuitry described above for the controller 150a. In general, the microcontroller 185a receives inputs (signals or data), executes software instructions to analyze the inputs, and generates outputs (signals or data) based on the analyses.

The microcontroller 185a receives the signals representing the average voltage applied to the motor 145, the average current through the motor 145, the zero crossings of the motor voltage, and the zero crossings of the motor current. Based on the zero crossings, the microcontroller 185a can determine a power factor and a power as was described earlier. The microcontroller 185a can then compare the calculated power with a power calibration value to determine whether a fault condition (e.g., due to an obstruction) is present.

The calibrating of the controller 150a occurs when the user activates a calibrate switch 195a. One example calibrate switch 195a is shown in FIG. 5A, which is similar to the calibrate switch 195 shown in FIG. 3A. Of course, other calibrate switches are possible. In one method of operation for the calibrate switch 195a, a calibration fob needs to be held near the switch 195a when the controller 150a receives an initial power. After removing the magnet and cycling power, the controller 150a goes through priming and enters an automatic calibration mode (discussed below).

The controller 150a controllably provides power to the motor 145. With references to FIGS. 4 and 5A, the controller 150a includes a retriggerable pulse generator circuit 200a. The retriggerable pulse generator circuit 200a includes resistors R15 and R16, capacitors C2 and C6, and pulse generators U3A and U3B, and outputs a value to the relay driver circuit 210a if the retriggerable pulse generator circuit 200a receives a signal having a pulse frequency greater than a set frequency determined by resistors R15 and R16, and capacitors C2 and C6. The retriggerable pulse generators U3A and U3B also receive a signal from power-up delay circuit 205a, which prevents nuisance triggering of the relays on startup. The relay driver circuits 210a shown in FIG. 5A includes resistors R1, R3, R47, and R52; diodes D1 and D5; and switches Q1 and Q2. The relay driver circuits 210a control relays K1 and K2. In order for current to flow to the motor, both relays K1 and K2 need to "close".

Figure 6:
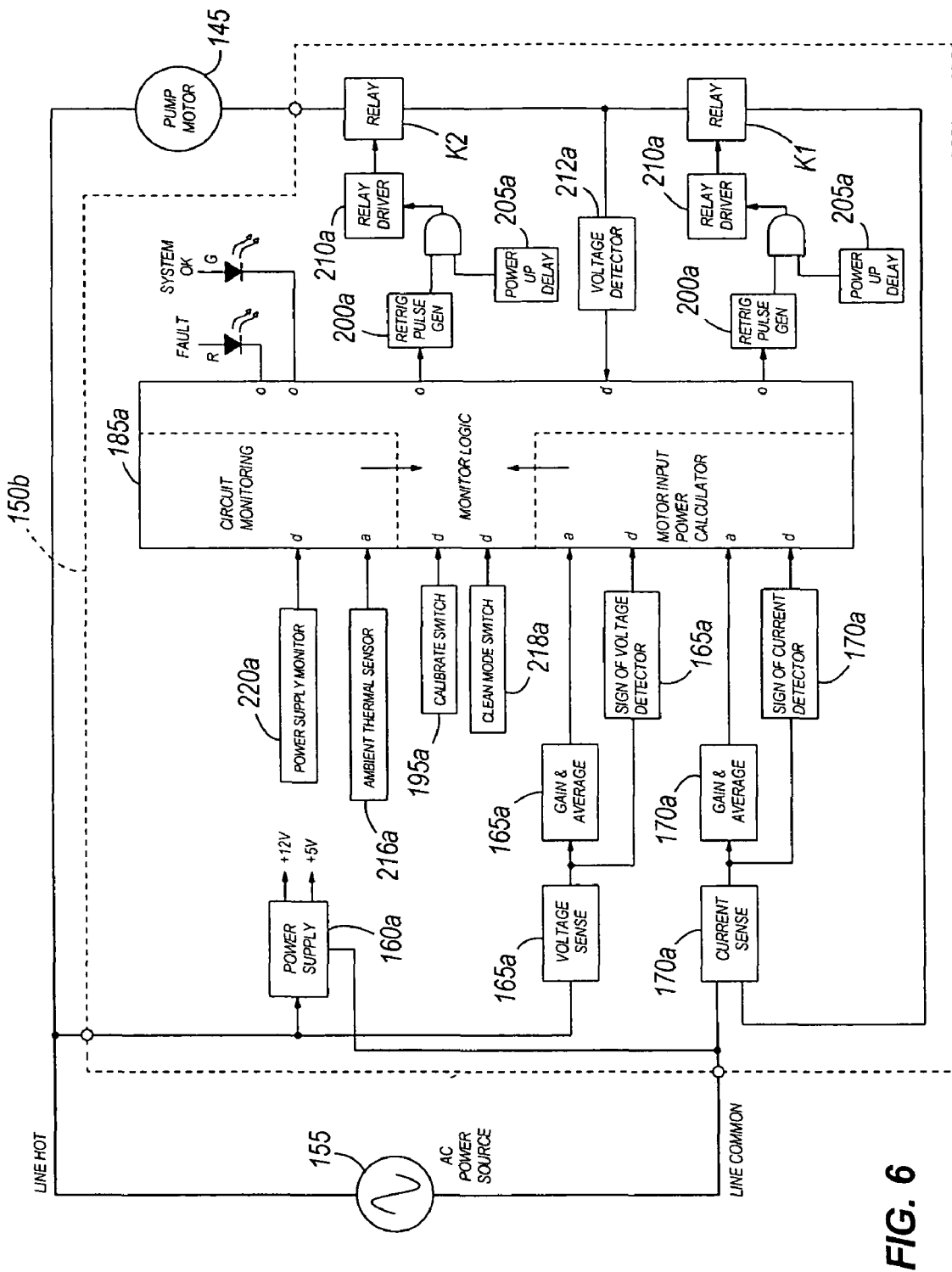
FIG. 6 is a block diagram of a third controller capable of being used in the jetted-spa shown in FIG. 1.

The controller 150a further includes two voltage detectors 212a and 214a. The first voltage detector 212a includes resistors R71, R72, and R73; capacitor C26; diode D14; and switch Q4. The first voltage detector 212a detects when voltage(is present across relay K1, and verifies that the relays are functioning properly before allowing the motor to be energized. The second voltage detector 214a includes resistors R66, R69, and R70; capacitor C9; diode D13; and switch Q3. The second voltage detector 214a senses if a two speed motor is being operated in high or low speed mode. The motor input power trip values are set according to what speed the motor is being operated. It is also envisioned that the controller 150a can be used with a single speed motor without the second voltage detector 214a (e.g., controller 150b is shown in FIG. 6).

The controller 150a also includes an ambient thermal sensor circuit 216a for monitoring the operating temperature of the controller 150a, a power supply monitor 220a for monitoring the voltages produced by the power supply 160a, and a plurality of LEDs DS1 and DS3 for providing information to the user. In the construction shown, a green LED DS2 indicates power is applied to the controller 150a, and a red LED DS3 indicates a fault has occurred. Of course, other interfaces can be used for providing information to the operator.

The controller 150a further includes a clean mode switch 218a, which includes switch U4 and resistor R10. The clean mode switch can be actuated by an operator (e.g., a maintenance person) to deactivate the power monitoring function described herein for a time period (e.g., 30 minutes so that maintenance person can clean the vessel 105). Moreover, the red LED DS3 can be used to indicate that controller 150a is in a clean mode. After the time period, the controller 150a returns to normal operation. In some constructions, the maintenance person can actuate the clean mode switch 218a for the controller 150a to exit the clean mode before the time period is completed.

In yet another construction, the operator can determine a desired time period for the controller 150a to operate in clean mode. For example, the maintenance person can actuate the clean mode switch 218a a predefined number of times to indicate a desired length of time for the controller 150a to operate in the clean mode. In some cases when relatively low maintenance of the vessel 105 is needed, the operator can actuate the clean mode switch 218a to operate in clean mode for 10 minutes. In other cases when more maintenance is needed, the operator can actuate the clean mode switch 218a to operate in the clean mode for 1 hour, for example. The red LED DS3 can be used to visually indicate the amount of time the maintenance person has programmed the controller 150a to operate in the clean mode.

In some cases, it may be desirable to deactivate the power monitoring function for reasons other than performing cleaning operations on the vessel 105. Such cases may be referred as "deactivate mode", "disabled mode", "unprotected mode", or the like. Regardless of the name, this later mode of operation can be at least partially characterized by the instructions defined under the clean mode operation above. Moreover, when referring to the clean mode and its operation herein, the discussion also applies to these later modes for deactivating the power monitoring function and vice versa.

The following describes the normal sequence of events for one method of operation of the controller 150a, some of which may be similar to the method of operation of the controller 150. When the fluid movement system 110 is initially activated, the system 110 may have to prime (discussed above) the suction side plumbing and get the fluid flowing smoothly (referred to as "the normal running period"). It is during the normal running period that the circuit is most effective at detecting an abnormal event.

Upon a system power-up, the system 110 can enter a priming period. The priming period can be preset for a time duration (e.g., a time duration of 3 minutes), or for a time duration determined by a sensed condition. After the priming period, the system 110 enters the normal running period. The controller 150a can include instructions to perform an automatic calibration to determine one or more calibration values after a first system power-up. One example calibration value is a power calibration value. In some cases, the power calibration value is an average of monitored power values over a predetermined period of time. The power calibration value is stored in the memory of the microcontroller 185, and will be used as the basis for monitoring the vessel 105.

If for some reason the operating conditions of the vessel 105 change, the controller 150a can be re-calibrated by the operator. In some constructions, the operator actuates the calibrate switch 195a to erase the existing one or more calibration values stored in the memory of the microcontroller 185. The operator then powers down the system 110, particularly the motor 145, and performs a system power-up. The system 110 starts the automatic calibration process as discussed above to determine new one or more calibration values. If at any time during normal operation, the monitored power varies from the power calibration value (e.g., varies from a 12.5% window around the power calibration value), the motor 145 will be powered down and a fault indicator is lit.

In one construction, the automatic calibration instructions include not monitoring the power of the motor 145 during a start-up period, generally preset for a time duration (e.g., 2 seconds), upon the system power-up. In the case when the system 110 is operated for the first time, the system 110 enters the prime period, upon completion of the start-up period, and the power of the motor 145 is monitored to determine the power calibration value. As indicated above, the power calibration value is stored in the memory of the microcontroller 185. After completion of the 3 minutes of the priming period, the system 110 enters the normal running period. In subsequent system power-ups, the monitored power is compared against the power calibration value stored in the memory of the microcontroller 185 memory during the priming period. More specifically, the system 110 enters the normal running period when the monitored power rises above the power calibration value during the priming period. In some cases, the monitored power does not rise above the power calibration value within the 3 minutes of the priming period. As a consequence, the motor 145 is powered down and a fault indicator is lit.

In other constructions, the priming period of the automatic calibration can include a longer preset time duration (for example, 4 minutes) or an adjustable time duration capability. Additionally, the controller 150a can include instructions to perform signal conditioning operations to the monitored power. For example, the controller 150a can include instructions to perform an IIR filter to condition the monitored power. In some cases, the IIR filter can be applied to the monitored power during the priming period and the normal operation period. In other cases, the IIR filter can be applied to the monitored power upon determining the power calibration value after the priming period.

Similar to controller 150, the controller 150a measures motor input power, and not just motor power factor or input current. However, it is envisioned that the controllers 150 or 150a can be modified to monitor other motor parameters (e.g., only motor current, only motor power factor, or motor speed). But motor input power is the preferred motor parameter for controller 150a for determining whether the water is impeded. Also, it is envisioned that the controller 150a can be modified to monitor other parameters (e.g., suction side pressure) of the system 110.

For some constructions of the controller 150a, the microcontroller 185a monitors the motor input power for an over power condition in addition to an under power condition. The monitoring of an over power condition helps reduce the chance that controller 150a was incorrectly calibrated, and/or also helps detect when the pump is over loaded (e.g., the pump is moving too much fluid).

The voltage sense and average circuit 165a generates a value representing the averaged power line voltage and the current sense and average circuit 170a generates a value representing the averaged motor current. Motor power factor is derived from the timing difference between the sign of the voltage signal and the sign of the current signal. This time difference is used to look up the motor power factor from a table stored in the microcontroller 185a. The averaged power line voltage, the averaged motor current, and the motor power factor are then used to calculate the motor input power using equation e1 as was discussed earlier. The calculated motor input power is then compared to the calibrated value to determine whether a fault has occurred. If a fault has occurred, the motor is powered down and the fault indicator is lit.

Redundancy is also used for the power switches of the controller 150a. Two relays K1 and K2 are used in series to do this function. This way, a failure of either component will still leave one switch to turn off the motor 145. As an additional safety feature, the proper operation of both relays is checked by the microcontroller 185a every time the motor 145 is powered on via the relay voltage detector circuit 212a.

Another aspect of the controller 150a is the use of several monitoring functions to verify that all the circuits are working as intended. These functions can include verifying whether input voltage is in a reasonable range (i.e. 85 to 135 VAC, or 175 to 255 VAC), and verifying whether motor current is in a reasonable range (5% to 95% of range). Also, if motor current exceeds 135% of its calibrated value, the motor may be considered over-loaded and is powered down.

The controller 150a also monitors the power supply 160a and the ambient temperature of the circuitry of the controller 150a. If either is out of proper range, the controller 150a will power down the motor 145 and declare a fault. The controller 150a also monitors the sign of the power line voltage and the sign of the motor current. If the zero crossing pulses resulting from this monitoring is at a frequency less than a defined time (e.g., every 30 milliseconds), then the motor powers down.

Another aspect of the controller 150a is that the microcontroller 185a provides pulses at a frequency greater than a set frequency (determined by the retriggerable pulse generator circuits) to close the relays K1 and K2. If the pulse generators U3A and U3B are not triggered at the proper frequency, the relays K1 and K2 open and the motor powers down.

Another aspect of some constructions of the controller 150a is that the microcontroller 185a includes an automatic reset feature, which may help to recognize a nuisance trip (e.g., due to an air bubble in the fluid-movement system 110). For this aspect, the microcontroller 185a, after detecting a fault and powering down the motor, waits a time period (e.g., a minute), resets, and attempts to start the pump. If the controller 150a cannot successfully start the pump after a defined number of tries (e.g., five), the microcontroller 185a locks until powered down and restarted. The microcontroller 185a can further be programmed to clear the fault history if the pump runs normally for a time period.

The microcontroller 185a can include a startup-lockout feature that keeps the monitor from indicating abnormal conditions during a priming period, thereby preventing unnecessary nuisance trips. In one specific method of operation, the microcontroller 185a initiates a lockout-condition upon startup, but monitors motor input power upon startup. If the pump 140 is priming, the input is typically low. Once the input power enters a monitoring window (e.g., within 12.5% above or below the power calibration value) and stays there for a time period (e.g., two seconds), the microcontroller 185 ceases the lockout condition and enters normal operation even though the pump may not be fully primed. This feature allows the controller 150a to perform normal monitoring as soon as possible, while reducing the likelihood of nuisance tripping during the priming period. For example, a complete priming event may last two-to-three minutes after the controller 150a is powered up. However, when the motor input power has entered the monitoring window, the suction force on the inlet 115 is sufficient for entrapment. By allowing the controller to enter run mode at this point, the likelihood of a suction event is greatly reduced through the remaining portion of the priming period. Therefore, the just-described method of operation for ceasing the lockout condition provides a greater efficiency of protection than a timed, startup lockout.

While numerous aspects of the controller 150a were discussed above, not all of the aspects and features discussed above are required for the invention. Additionally, other aspects and features can be added to the controller 150a shown in the figures.

As previously indicated, the microcontroller 185, 185a can calculate an input power based on parameters such as averaged voltage, averaged current, and power factor. The microcontroller 185, 185a then compares the calculated input power with the power calibration value to determine whether a fault condition (e.g., due to an obstruction) is present. Other constructions can include variations of the microcontroller 185, 185a and the controller 150, 150a operable to receive other parameters and determine whether a fault condition is present.

Figure 7:
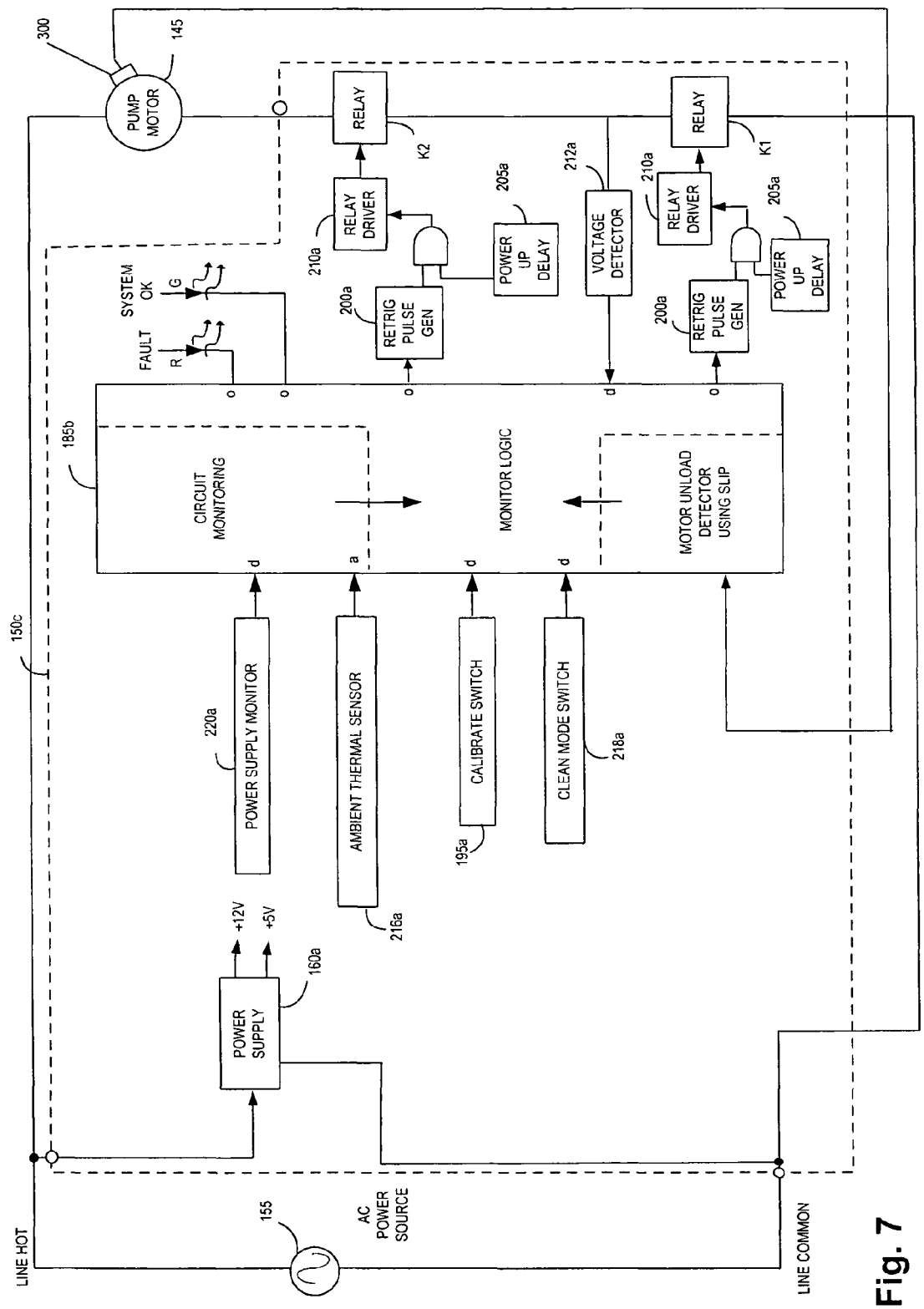
FIG. 7 is a block diagram of a fourth controller capable of being used in the jetted-spa shown in FIG. 1.

In the construction shown in FIG. 7, a sensor 300 is coupled to the motor 145 to detect a characteristic of the motor 145, such as motor speed. In other constructions, the sensor 300 can detect other characteristics of the motor 145. Controller 150c includes microcontroller 185b receiving at least a signal from the sensor 300 indicative of the motor speed. In the construction shown in FIG. 7, the microcontroller 185b can use the motor speed and rated parameters of the motor 145 to determine an output power. The microcontroller 185b can also monitor the output power to determine whether a fault condition is present similar to the previous constructions (e.g. microcontroller 185, 185a) utilizing the input power.

Figure 8:
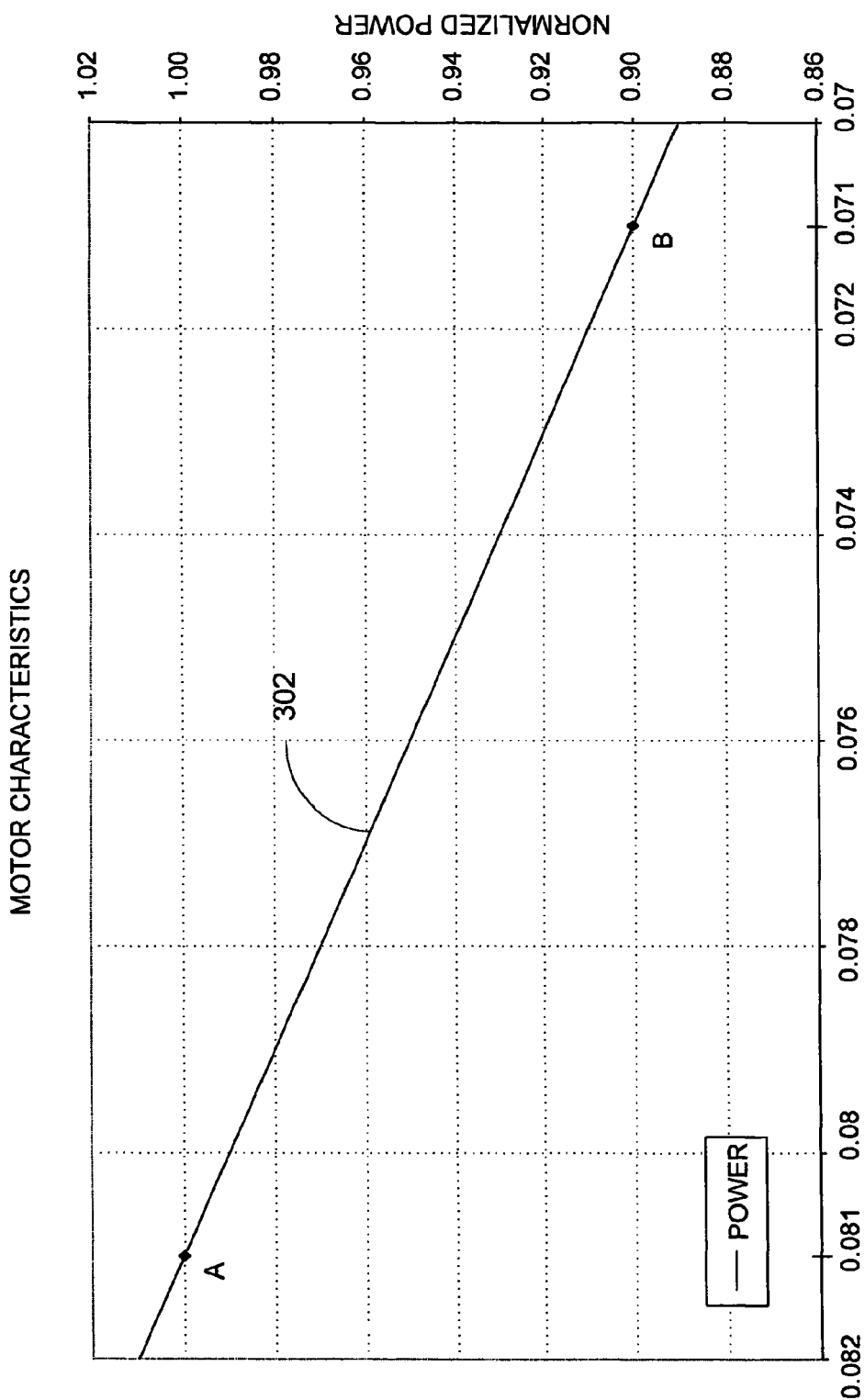
FIG. 8 is a chart indicating the relationship between rated slip and normalized power of the motor 145.

FIG. 8 shows the output power of one exemplary motor 145 as a function of slip (horizontal axis) and normalized power (vertical axis). In reference to FIGS. 7-8, line 302 is indicative of the relationship between the slip, which is a function of the speed of the motor 145, and normalized power. In the illustrated construction, marker A indicates a slip of 0.081 at a rated normalized power of 1, and maker B indicates a slip of 0.071 at a normalized power of 0.9. The microcontroller 185*b* detects the motor speed from sensor 300 and determines the slip utilizing formulas known by those skilled in the art. It is determined that a slip drop of 12% (e.g. from 0.081 at marker A to 0.071 at marker B) is representative of a 10% reduction in output power of the motor 145. Thus, by monitoring the motor speed, the controller 150*c* can detect a fault condition and stop operation of the motor 145 according to the procedures previously described. It is to be understood that the information shown in FIG. 8 corresponds to one particular motor and that other motors can have different characteristics.

Figure 9:
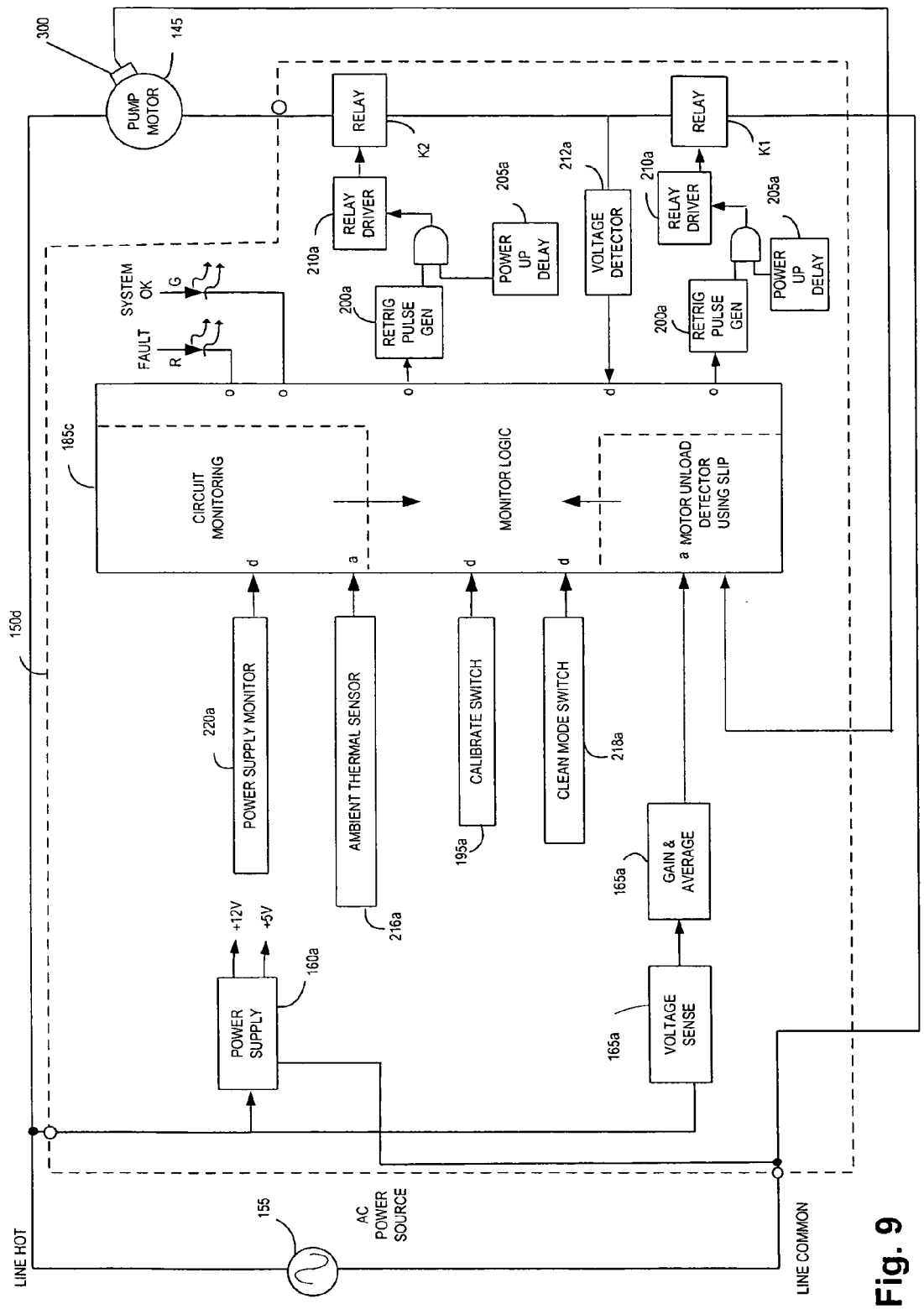
FIG. 9 is a block diagram of a fifth controller capable of being used in the jetted-spa shown in FIG. 1.

In another construction shown in FIG. 9, controller 150*d* includes the voltage sense and average circuit 165*a*, similar to the one shown in FIGS. 4 and 6, feeding a DC average voltage to microcontroller 185*c* to at least determine a value of a normalized input voltage. Under relatively normal operating conditions, the normalized input voltage is determined to stay substantially constant at 1 unit and the slip is monitored to determine a fault condition similar to the construction shown in FIG. 7. In the construction shown in FIG. 9, some operating conditions other than normal can be determined by the change of value of the normalized input voltage. More particularly, the microcontroller 185*c* can adjust the slip value at which a fault condition is determined based on the determined values of the normalized input voltage using equation e2.

$$S_{trip} = S_{cal}\left(\frac{V_{cal}}{V_{meas}}\right)^2 \qquad [e2]$$

where $S_{trip}$ is the new slip at which a fault conditioned is determined, $S_{cal}$ is the calibrated slip at normalized voltage equal to 1, $V_{cal}$ is the calibrated normalized voltage (generally a value of 1), and $V_{meas}$ is the measured normalized voltage indicative of at least one operating condition other than normal.

In one particular example where the normalized voltage is determined to be 0.8, the slip value for a fault condition is calculated using equation e2 to a new value approximately of 0.111. For this particular example, a slip drop of 12% is representative of an approximate drop in normalized power of 7.5%. In another example, where the normalized voltage is determined to be 1.2, the slip value for a fault condition can be calculated to a new value of 0.049. A slip drop of 12% is representative of an approximate drop in normalized power of 12.5%. For these two examples, it is possible to determine by experimentation a new equation e3 to better approximate the slip drop of 12% to a drop of normalized power to 10%.

$$S_{trip} = S_{cal}\left(\frac{V_{cal}}{V_{meas}}\right)^{1.84} \qquad [e3]$$

It is to be understood that e3 is applicable to the motor with the characteristics shown in FIG. 8. Other motors require the same type of experimentation to determine a similar equation.

Figure 10:
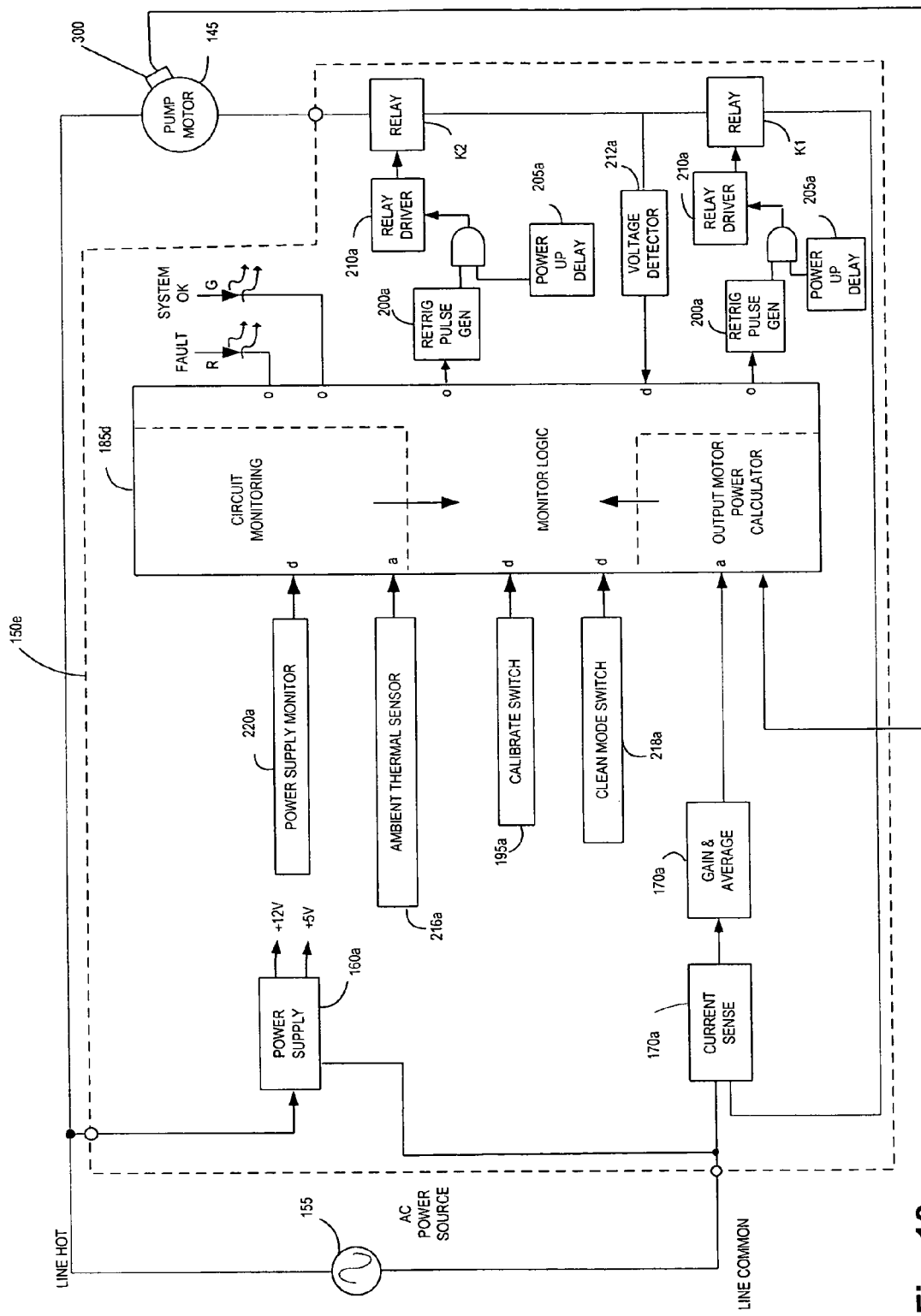
FIG. 10 is a block diagram of a sixth controller capable of being used in the jetted-spa shown in FIG. 1.

In yet another construction shown in FIG. 10, controller 150*e* includes the current sense and average circuit 170*a*, similar to the one in FIGS. 4 and 6, to at least sense the current though the motor 145. In the construction shown in FIG. 10, microcontroller 185*d* uses the motor speed, the sensed current, and a set of calculation parameters preprogrammed in the microcontroller 185*d* to determine the output power of the motor 145. It is also possible that the calculation parameters, used by the microcontroller 185*d* to calculate the output power of the motor 145, be determined during the automatic calibration process previously described. Some of the calculation parameters corresponding to a motor 145 are: stator resistance, stator leakage reactance, magnetizing reactance, rotor leakage reactance, and rotor resistance. Thus, the microcontroller 185*d* can include instructions to determine the output power of the motor 145 using the sensed current, the sensed motor speed, and the calculation parameters. The instructions are generally equations known by those skilled in the art. It is to be understood that other constructions of the controller 150, 150*a*, 150*b*, 150*c*, 150*d*, and 150*e* are possible and that the constructions illustrated herein are not limiting to the invention.

The constructions described above and illustrated in the figures are presented by way of example only and are not intended as a limitation upon the concepts and principles of the invention. Various features and advantages of the invention are set forth in the following claims.

What is claimed is:

1. A method of controlling a pumping apparatus for a jetted-fluid system comprising a vessel for holding a fluid, a drain, and a return, the pumping apparatus comprising
   a pump having an inlet fluidly connectable to the drain to receive the fluid, and an outlet fluidly connectable to the return to exhaust the fluid, and
   a motor coupled to the pump to operate the pump, the method comprising:
   determining a power calibration value for the motor, the power calibration value being calculated using at least one of a value for a motor current and a value for a motor voltage;
   initiating a first mode of operation for the pumping apparatus;
   controlling the motor to controllably operate the pump to pump the fluid during the first mode of operation;
   monitoring an electrical characteristic of the motor power when operating the pump during the first mode of operation;
   receiving a user-initiated monitoring interrupt signal;
   initiating a second mode of operation in response to receiving the user-initiated monitoring interrupt signal;
   ceasing the monitoring of the electrical characteristic of the motor power during the second mode of operation;
   controlling the motor to controllably operate the pump to pump the fluid during the second mode of operation;
   reinitiating the first mode of operation;
   determining, during the first mode of operation, a power value having a relation to the electrical characteristic of the motor power; and
   initiating, during the first mode of operation and not the second mode of operation, a fault mode when the power value is a predetermined percentage of the power calibration value.

2. The method of claim 1, wherein the monitoring comprises monitoring a power of the motor.

3. The method of claim 2, wherein the method further comprises determining whether the monitored electrical characteristic of the motor power indicates a condition of the pump, and wherein the controlling the motor during the first mode of operation is based on the condition of the pump.

4. The method of claim 3, wherein the condition is a desired flow of fluid through the pump, and wherein the controlling the motor includes allowing continued operation of the pump when determining the monitored electrical characteristic of the motor power indicates the desired flow of fluid through the pump.

5. The method of claim 3, wherein the condition is an undesired flow of fluid through the pump, and wherein the controlling the motor includes preventing continued operation of the pump when determining the monitored electrical characteristic of the motor power indicates the undesired flow of fluid through the pump.

6. The method of claim 1, wherein the reinitiating the first mode of operation occurs a time period after receiving the user-initiated monitoring interrupt signal.

7. The method of claim 1, wherein the method further comprises receiving a user-initiated monitoring signal, and wherein the reinitiating the first mode of operation occurs in response to receiving the user-initiated monitoring signal.

8. A method of controlling a pumping apparatus for a jetted-fluid system comprising a vessel for holding a fluid, a drain, and a return, the pumping apparatus comprising
   a pump having an inlet fluidly connectable to the drain to receive the fluid, and an outlet fluidly connectable to the return to exhaust the fluid, and
   a motor coupled to the pump to operate the pump, the method comprising:
   determining a calibration value for an electrical characteristic of the motor power, the calibration value being calculated using at least one of a value for a motor current and a value for a motor voltage;
   initiating a first mode of operation for the pumping apparatus;
   controlling the motor to controllably operate the pump to pump the fluid during the first mode of operation;
   monitoring the electrical characteristic of the motor power when operating the pump during the first mode of operation;
   determining whether the monitored electrical characteristic of the motor power indicates a condition of the pump and further controlling the motor based on the condition of the pump;
   initiating during the first mode of operation, a fault mode when the monitored electrical characteristic of the motor power is a predetermined percentage of the calibration value;
   receiving a user-initiated control interrupt signal;
   initiating a second mode of operation based on the user-initiated control interrupt signal;
   controlling the motor to controllably operate the pump to pump the fluid during the second mode of operation;
   monitoring the electrical characteristic of the motor power when operating the pump during the second mode of operation;
   further controlling the motor without regard for a value of the monitored electrical characteristic of the motor power during the second mode of operation such that control of the motor will not be altered if the condition of the pump is indicated; and
   reinitiating the first mode of operation.

9. The method of claim 8, wherein the monitoring during the first and second modes comprises monitoring a value of the motor power.

10. The method of claim 8, wherein the condition is a desired flow of fluid through the pump, and wherein the controlling the motor during the first mode of operation includes allowing continued operation of the pump when determining the monitored electrical characteristic of the motor power indicates the desired flow of fluid through the pump.

11. The method of claim 8, wherein the condition is an undesired flow of fluid through the pump, and wherein the controlling the motor during the first mode of operation includes preventing continued operation of the pump when determining the monitored electrical characteristic of the motor power indicates the undesired flow of fluid through the pump.

12. The method of claim 8, wherein the reinitiating the first mode of operation occurs a time period after receiving the user-initiated control interrupt signal.

13. The method of claim 8, wherein the method further comprises receiving a user-initiated control signal, and wherein the reinitiating the first mode of operation occurs in response to receiving the user-initiated control signal.

* * * * *